United States Patent
Lemelson

[11] 3,787,997
[45] Jan. 29, 1974

[54] MODEL AIRPLANE STRUCTURES

[76] Inventor: Jerome H. Lemelson, 85 Rector St., Metuchen, N.J. 08840

[22] Filed: July 6, 1971

[21] Appl. No.: 160,005

[52] U.S. Cl. .................................................. 46/78
[51] Int. Cl. ............................................ A63h 27/00
[58] Field of Search .................. 46/74, 78, 76, 79

[56] References Cited
UNITED STATES PATENTS
2,275,645  3/1942  Perron ............................ 46/78 UX
3,222,816  12/1965  Effinger ................................. 46/78
1,507,192  9/1924  Laukandt ............................... 46/78

Primary Examiner—Louis G. Mancene
Assistant Examiner—D. L. Weinhold
Attorney, Agent, or Firm—Jerome H. Lemelson

[57] ABSTRACT

A rubber band powered model airplane is provided having an elongated body made substantially entirely of a lightweight expanded, cellular plastic. A passageway extends completely through the elongated body to accommodate a rubber band motor. In one form, the passageway is lined with a thin walled, non cellular tube of substantially greater rigidity than the material comprising the body. The tube serves to both longitudinally reinforce the body, and retain the nose and tail fittings for the propellor and rubber band motor.

10 Claims, 8 Drawing Figures

PATENTED JAN 29 1974 3,787,997

INVENTOR.
JEROME H. LEMELSON

MODEL AIRPLANE STRUCTURES

SUMMARY OF THE INVENTION

This invention relates to new and improved structures in model aircraft particularly flying models produced substantially of expanded, cellular plastic material of relatively light weight.

Model aircraft made of plastic materials have generally been relatively too heavy due to the fact that most plastics either cannot be easily molded in the shape of a model airplane body and wings having a wall thickness sufficiently fine to produce a light enough structure for flying purposes. While balsa wood has been employed to produce lightweight model aircraft bodies and wings, it is relatively costly to fabricate into bodies of monocoque structure.

The instant invention is concerned primarily with novel constructions and assembly features of model airplanes made substantially of lightweight expanded cellular plastic material which is generally incapable of supporting conventional fittings or thrust bearings for the propellor without the rapid deterioration or destruction of the portions of the body supporting said fittings. Expanded cellular polystyrene utilized in a light enough density to permit the construction of a model airplane which flies and glides well, for example, may be easily compressed or permanently deformed by the application of moderate forces thereto. With an increase in density to prevent the compressive distortion or destruction of such a body, the weight of the entire body is substantially increased to a point whereby the model will not fly.

Accordingly it is a primary object of this invention to provide new and improved structures in model aircraft, particularly aircraft made substantially of cellular, foamed plastic materials.

Another object is to provide a new and improved structure in a hollow, model airplane body having reinforcing means for a rubber band motor thereof which also serves a number of other purposes;

Another object is to provide a flying made substantially of a single integral molding and containing a longitudinal opening therethrough defining the body as having a hollow configuration.

Another object is to provide a hollow model airplane body made of expanded plastic containing a lining of substantially greater rigidity than the body and extending along the inside surface of the interior of the body for longitudinally supporting same and for providing a housing for a rubber band motor extending therethrough.

Another object is to provide new and improved structures in flying model airplanes fabricated of lightweight plastic materials.

With the above and such other objects in view as may hereafter appear, the invention consists of the novel constructions and combinations of parts which are described hereafter and will become apparent from studying the accompanying drawings and specification but it is to be understood that changes and modifications thereto may be resorted to without departing from the spirit and nature of the invention.

Figures 1, 1A, 1B, 2, 3, 4, 5, 6:
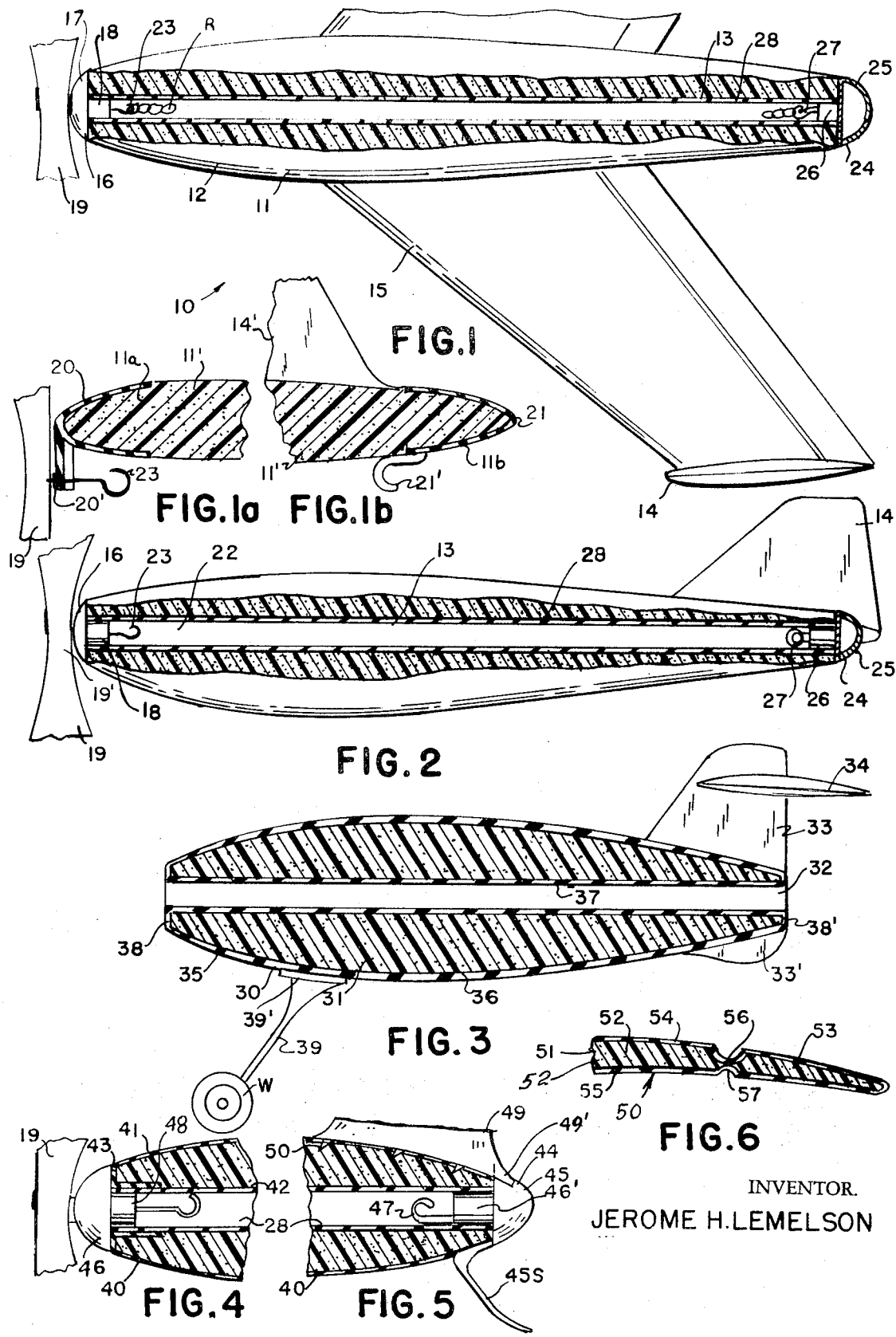
FIG. 1 is a partially sectioned plan view of part of a model airplane produced mostly of expanded, lightweight plastic material.
FIG. 1a is a side cross section view of a portion of the nose end of a model airplane which is a modified form of that shown in FIG. 1.
FIG. 1b is a cross sectional view of the tail end of a modified form of the model airplane shown in FIG. 1.
FIG. 2 is a side view with parts partially cross sectioned for clarity, of the model airplane of FIG. 1.
FIG. 3 is a side view of a model airplane body in cross section showing further details of a modified form of the invention.
FIG. 4 is a side view in cross section of a portion of the nose end of a body of the type shown in FIGS. 1 and 2.
FIG. 5 is a cross sectional view of the tail end of a body of the type shown in FIG. 2.
FIG. 6 is a cross sectional view taken chordwise of a wing or tail surface of the type provided by one of the embodiments of the drawings.

There is shown in FIGS. 1 and 2 constructional details of a new and improved model airplane 10 composed of an elongated body 11 having wings 15 which are preferably integrally molded with the body and have integrally molded at their wing tips respective rudders 14 for stabalizing the model airplane. The passageway 13 extending longitudinally through the body is a relatively small diameter, say ⅜ to ¾ inch diameter. The outer surface of tube 28 preferably conforms to and is either frictionally engaged with the inside surface of the passageway 13 extending through the body or is adhesively bonded thereto. Supported at the nose end of the tube 28 is a nose plug 16 having a head 17 and a longitudinal hole (not shown) therethrough for accommodating the propellor shaft 23 which is secured to the propellor 19 supported in bearing at the forward end of nose plug 16. The nose plug 16 is shown having a shank 18 through which the nose hook 23 extends. The outside surface of shank 18 either frictionally conforms to the inside surface of the tube 13, thereby eliminating the need to cement the head 16 of the nose plug to the nose end of the model or is cemented thereto.

The tail fitting 24 is shown as having a dome-like end wall 25 and a tubular protruding wall 26 containing a hook 27 secured thereto or molded integral therewith. Thus the hooks of shafts 23 and 27 are substantially longitudinally aligned with each other and each accommodate and end of the rubber band motor R as illustrated. In FIG. 1a the nose end 11a of an elongated stick type body 11' is shown having a paraboloid-like end fitting 20 secured thereto by friction or adhesive. The fitting 20 contains a downwardly projecting thrust bearing portion 20' through which the shaft 23 of the propellor 19 extends and is rotatably supported thereby.

The tail end of the model shown in FIG. 1a is illustrated in FIG. 1b. Said tail end contains a tail fitting 21 of substantially conical shape which circumscribes and is either frictionally or adhesively secured to the end of the body 11' as illustrated. Protruding downwardly and preferably integrally formed with fitting 21 of assembled thereto is a tail hook 21' for accommodating and retaining the rear end of the rubber band motor which is looped over the hook 23 of the propellor shaft as shown in FIG. 1a.

Notation 14' refers to a rudder which is integrally molded to the body 11' near the tail end thereof just forward of the fitting 21.

In FIG. 3, a new and improved structure in a model aircraft body is illustrated as being molded of an expanded plastic material forming the major portion of the body 31. A passageway 32 extends longitudinally completely through the body to accommodate a rubber band motor as described. The entire outer surface of the body 31 including the wall of the passageway 32 is shown as lined with a coating 36 which is preferably in the form of a skin provided either by molding said skin against the expanded plastic or forming the skin from the expanded plastic by the simple application of heat within the mold. The model airplane 30 thus is provided with a skin 36 not only disposed along the outer lateral surfaces 35 of the elongated body but also along the nose end wall 38 as illustrated to accommodate a nose fitting of the type illustrated in FIG. 2. The rudder 33 may be integrally molded with the body or attached thereto as a sub-rudder 33'. Notation 38' refers to that portion of the skin extending along the end wall of the body and 34 refers to an elevator which is integrally molded or secured to the upper portion of the rudder 33. Skin lining passageway 32 is denoted 37.

Also shown in FIG. 3 is a landing gear 39 having a sheet-like base 39' which may be adhesively bonded or otherwise fastened to the skin 35 extending along the nose end of the body.

In FIG. 4, a modified construction of the nose end 41 of a model airplane body 40 is shown as containing a tubular member 28 through and conforming to the inside surface of the wall of a hole or passageway 42 extending longitudinally through the body. A tubular member 43 having a lateral rim 43' is secured to the outside surface of the tubular member 28 at the nose end of the body and abuts the end of the nose portion 41 of the body 40. The fitting 43 provides ample surface against which the head 46 of a nose fitting may abut. The tail end 48 of the fitting 46 is preferably frictionally secured within the tubular member 42 as illustrated and supports a portion of the propellor shaft as shown. Tubular member 43 may be frictionally secured to the cellular plastic body or adhesively bonded thereto.

In FIG. 5, a tail fitting 44 is shown having its tubular shank 46' frictionally secured within the tubular member 28 extending through the body. The fitting 44 contains a hollow end head 45 and a tail strut 45S molded thereto and extending downwardly therefrom as shown.

The rudder 49 or vertical flight stabilizer is shown as having a thin walled base 49' conforming to the upper surface of the end portion of the body and containing barbs or pin like projections which penetrate the upper surface stratum of the body and retain the rudder 49 in place or retain while it is adhesively bonded to the body.

In FIG. 6, a modified form of wing applicable to the structure described, is shown. The wing 50 contains a core 51 of expanded plastic such as cellular polystyrene which contains a coating or skin of non-cellular polystyrene material completely surrounding the wing and including a thin layer 54 on the upper surface thereof, a second layer 55 on the lower surface of the wing and portions of the skin denoted 56 and 57 extending into a channel in the wing forming essentially a flexible hinged joint between sections 52 and 53. Thus, section 53 if unrestrained, may be bent upwardly or downwardly and adjusted in such directions to alter the flight characteristics of the model airplane. The structure 50 may comprise either a wing, elevator or rudder of a model airplane of the type described while the so called flexible poly hinge may be formed therein by the application of suitable heated dies to the upper and lower surfaces of the wing or tail section.

It is noted that the head of the noseplug 16 of FIGS. 1 and 2 may extend along and circumscribe a portion of the end of body 12 and may be bonded or frictionally secured thereto as does 20 of FIG. 1a.

I claim:

1. A flying model airplane comprising in combination:

An elongated body, the major portion of which is molded of a light wight cellular plastic material, wings and vertical flight stabilizing means attached to said body, a passageway extending longitudinally through said body, a tube made of a material of greater rigidity than the cellular plastic material of which said body is molded, said tube extending through said passageway and fixedly secured to said body so as to provide longitudinal reinforcing support for the light weight cellular plastic portion of the body, a nose fitting secured to the forward end of said body and supported by the forward end of said tube, a propeller shaft extending through said nose fitting, and into said tube, said propeller shaft being supported in bearing by said nose fitting, a propeller secured to said shaft, a rubber band secured to said shaft and extending through said tube, and means securing the other end of said rubber band at the other end of said tube.

2. A model airplane in accordance with claim 1 wherein said tube is made of a light weight plastic resin and the tube itself is greater in rigidity than the rigidity of said elongated cellular plastic portion of said body.

3. A model airplane in accordance with claim 1 wherein said tube contacts the wall of said passageway along a substantial portion of the length of said body.

4. A model airplane in accordance with claim 1 wherein said tube contacts and is frictionally held by the walls of said passageway.

5. A model airplane in accordance with claim 4 wherein said tube contacts substantially the entire length of the wall of said passageway and substantially longitudinally reinforces and improves the compressive strength of said cellular plastic body.

6. A model airplane in accordance with claim 1 wherein said tube is bonded to the wall of said passageway along its length.

7. A model airplane in accordance with claim 1 wherein said tube comprises a coating on the surface of the wall of said passageway along its entire length.

8. A model airplane in accordance with claim 7 including a coating lining the entire surface of said body.

9. A model airplane in accordance with claim 1 wherein said nose fitting has a tubular extension projecting into a frictionally engaged within said tube at one end thereof and a tail plug projecting into and frictionally engaged with said tube at the other end thereof.

10. A model airplane in accordance with claim 1 wherein said nose plug is defined at least in part by a hollow shell which circumscribes and engages a portion of the end of said cellular plastic body.

* * * * *